May 17, 1966        G. C. RUSSELL        3,251,163
CLAMP JOINT CONSTRUCTION FOR PREFABRICATED PANELS
Filed April 5, 1962        5 Sheets-Sheet 1
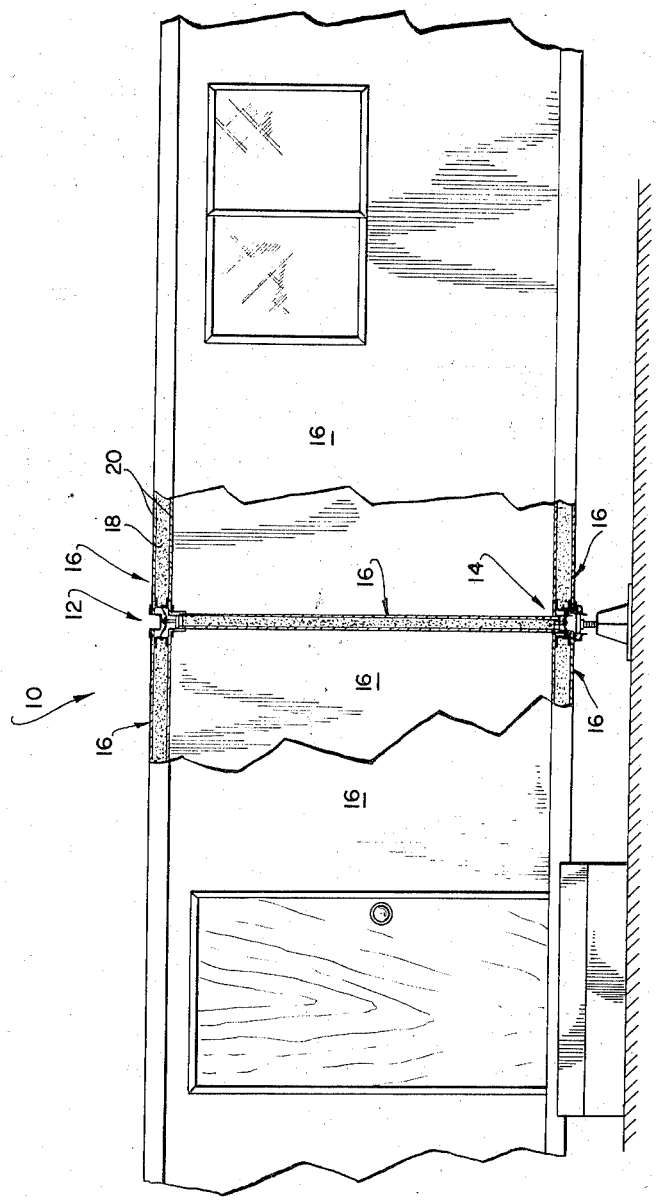
INVENTOR.
GORDON C. RUSSELL
BY
George C. Sullivan
Agent May 17, 1966 G. C. RUSSELL 3,251,163
CLAMP JOINT CONSTRUCTION FOR PREFABRICATED PANELS
Filed April 5, 1962 5 Sheets-Sheet 2
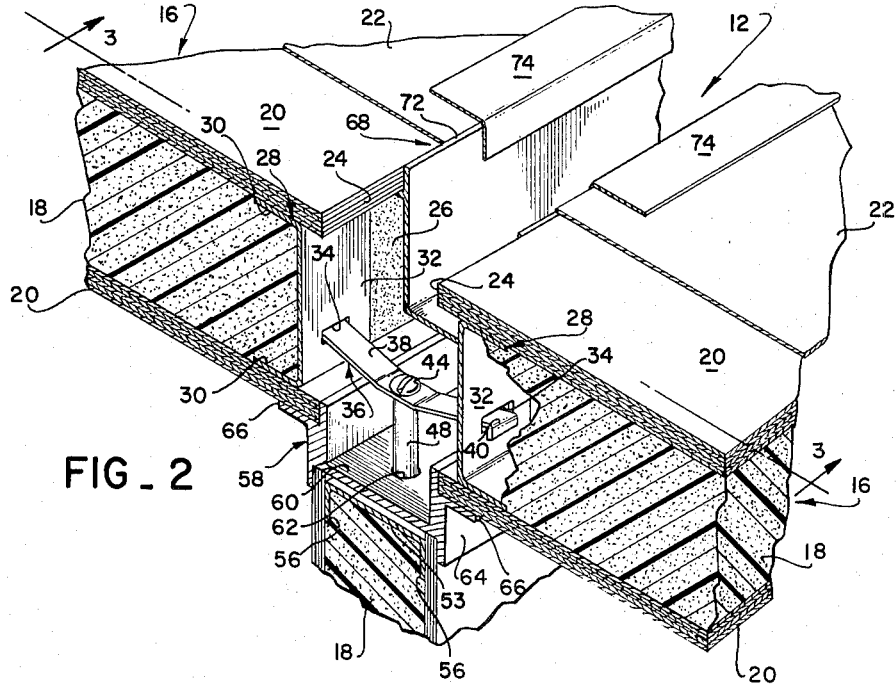
FIG_2
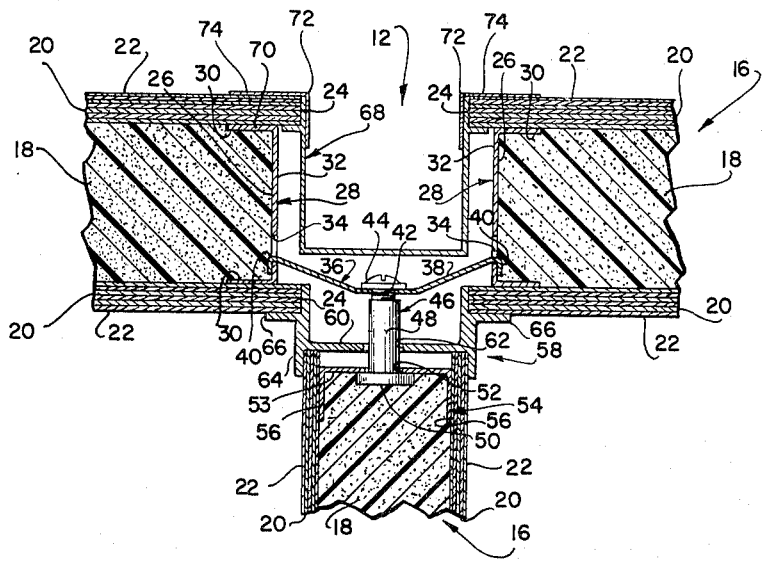
FIG_3
INVENTOR.
GORDON C. RUSSELL
BY
George C. Sullivan
Agent

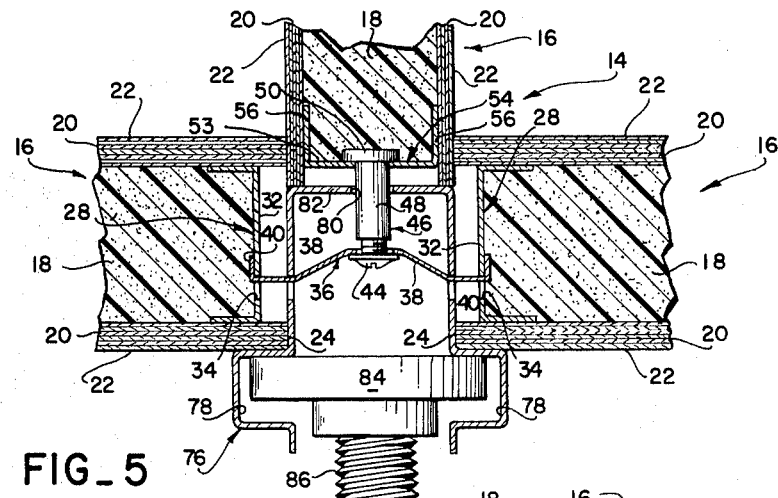
FIG_5
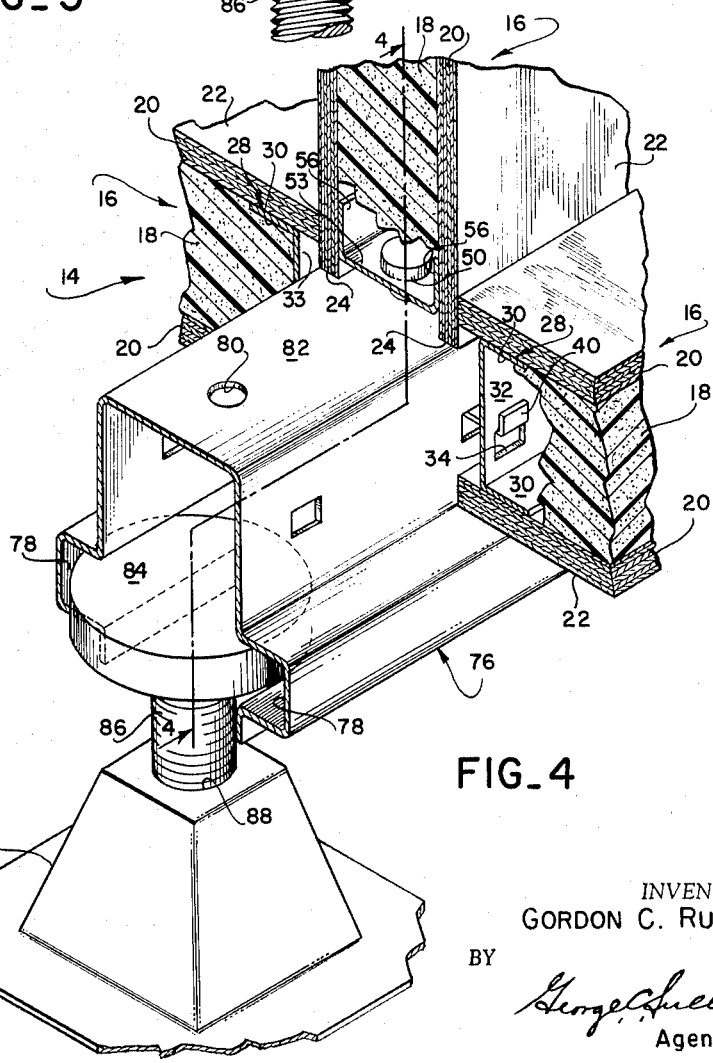
FIG_4

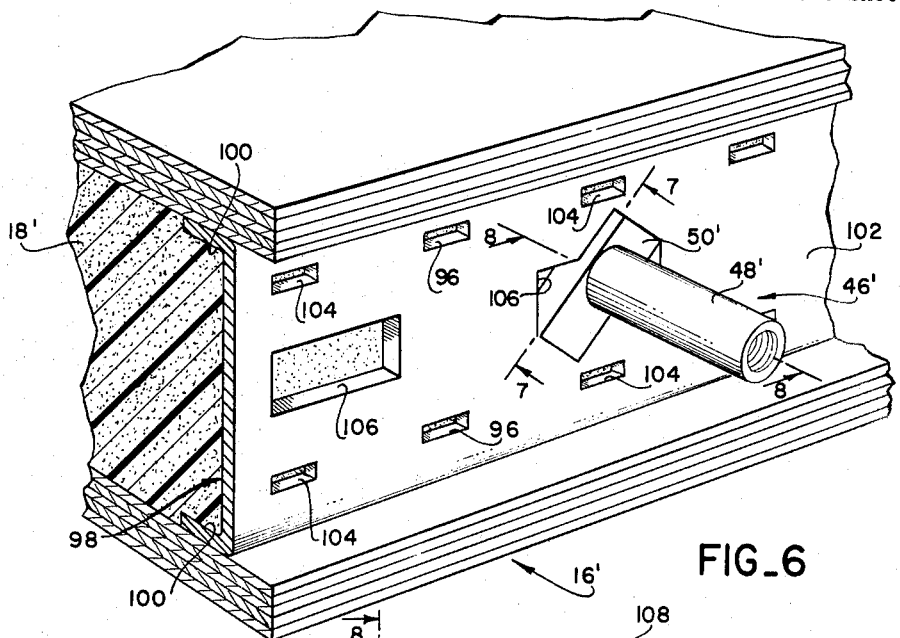
FIG_6
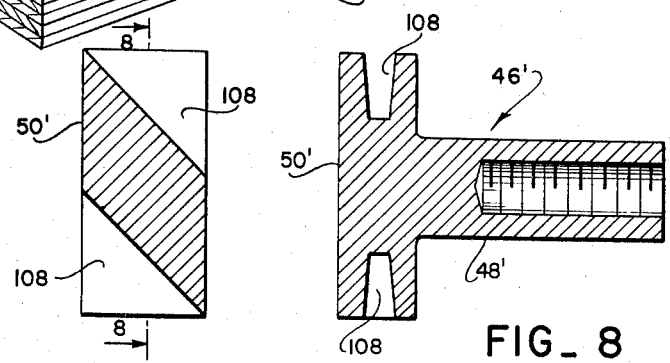
FIG_7  FIG_8
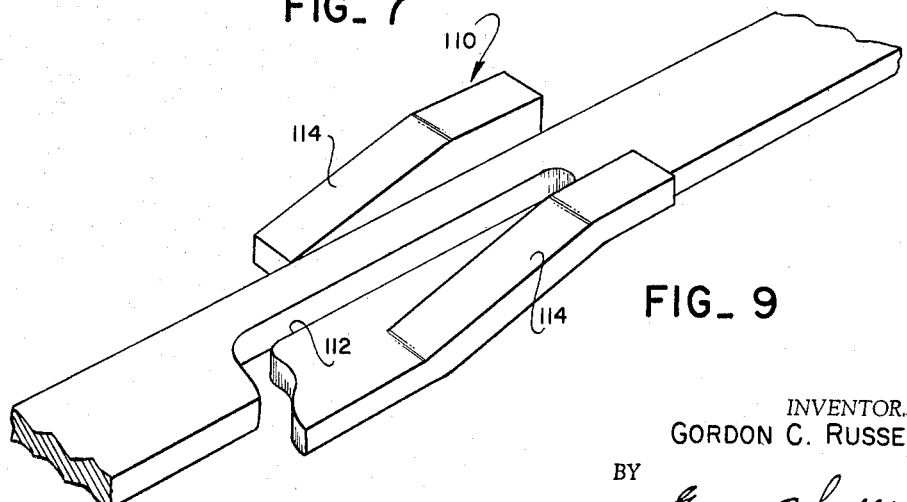
FIG_9

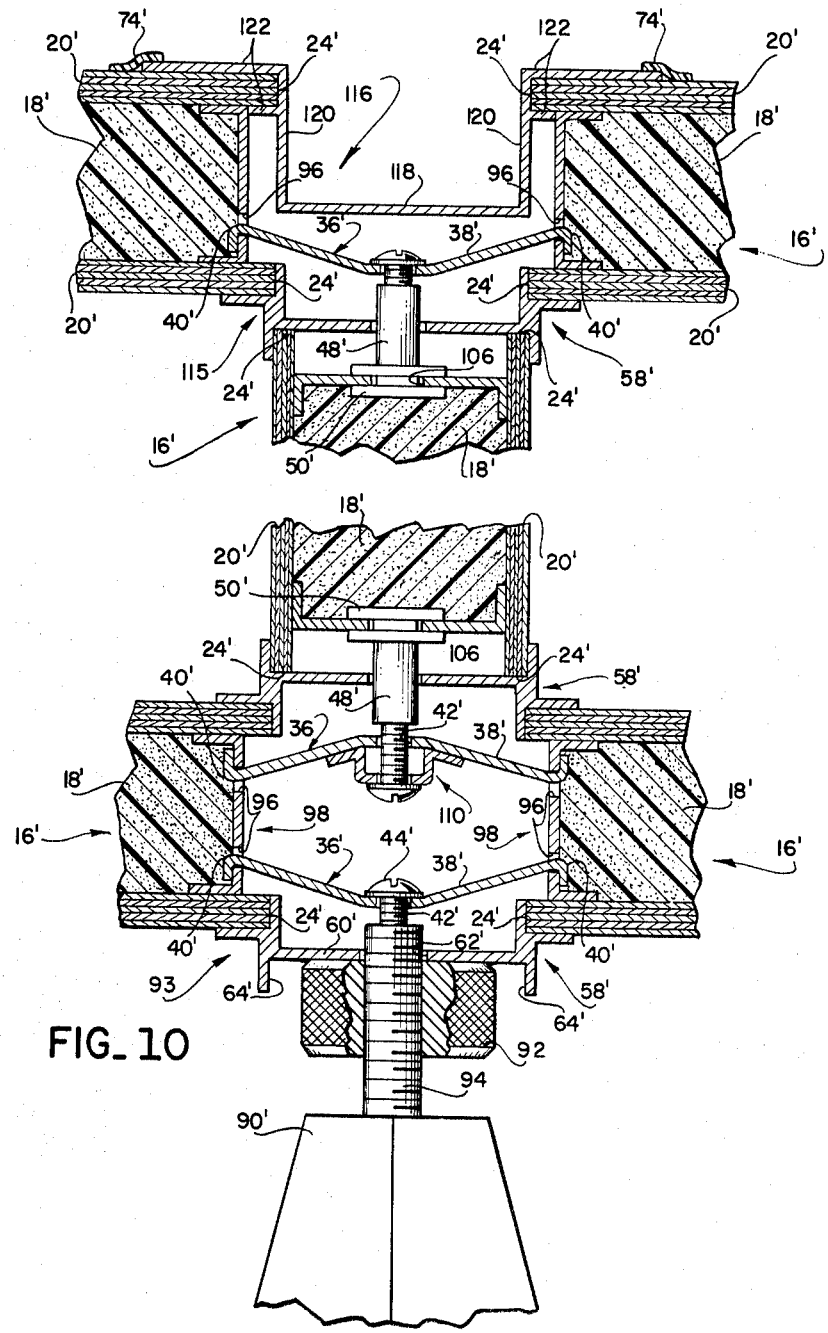

United States Patent Office 3,251,163
Patented May 17, 1966

3,251,163
CLAMP JOINT CONSTRUCTION FOR
PREFABRICATED PANELS
Gordon C. Russell, Studio City, Calif., assignor to Lockheed Aircraft Corporation, Burbank, Calif.
Filed Apr. 5, 1962, Ser. No. 185,334
1 Claim. (Cl. 52—282)

This invention pertains to new and improved building constructions, and more specifically to building joint constructions which are primarily intended to be used in connecting prefabricated panels to one another in a building or similar structure.

Within the past comparatively few years a number of efforts have been made in order to provide buildings and similar structures which utilize panels or walls which are differently constructed than present day, conventional building walls.

These panels are formed so as to utilize a center core of expanded cellular material such as expanded polystyrene, a rigid polyurethane cellular composition or the like. Because of the fact that these materials of a plastic character do not have all the desired properties for building purposes in panels as referred to above, these cores are usually sandwiched between layers of plywood or sheet plastic or physically similar materials, and these latter layers are in turn covered by an adherent, weather-resistant coating of a plastic material such as a polyvinyl chloride composition.

In utilizing panels as described above for constructional purposes there is a serious problem as to how to easily and conveniently form joints connecting several of these panels to one another so that the panels are located at right angles to one another. Any joint construction to be satisfactory for use with these panels must be of a low-cost character. In addition any such joint construction must be of such a character that it is capable of being installed or created on a job site by extremely unskilled labor with a minimum of difficulty in a comparatively short period. This latter is considered to be extremely important particularly where buildings or the like are to be created in comparatively undeveloped areas where skilled building labor is relatively unavailable. It is also necessary that any such joint construction be sufficiently rigid so as to prevent relative movement of the panels joined by it under wind, snow or other related conditions as well as load bearing to support the building construction.

A broad object of the present invention is to provide new and improved joint constructions meeting these needs. A related object of the present invention is to provide joint constructions for joining panels located transverse to one another which are relatively inexpensive, easy to install and effective when used.

These and various other objects of this invention, as well as many specific advantages of the invention will be more fully apparent from a detailed consideration of the remainder of this specification including the appended claim and the accompanying drawings, in which:

FIGURE 1 is a partial, side elevational view of a building utilizing joint constructions of this invention shown broken away so as to expose certain of these joint constructions;

FIGURE 2 is a perspective view, partially broken away, illustrating a joint construction used in the building shown in FIGURE 1;

FIGURE 3 is a cross-sectional view taken at line 3–3 of FIGURE 2;

FIGURE 4 is a view similar to FIGURE 2 of another joint construction employed in the building shown in FIGURE 1;

FIGURE 5 is a cross-sectional view taken at line 4–4 of FIGURE 4;

FIGURE 6 is a perspective view of the edge or end of a particular panel capable of being employed in a joint construction of this invention showing a part of a holding device attached to this panel;

FIGURE 7 is a cross-sectional view taken at line 7–7 of FIGURE 6;

FIGURE 8 is a cross-sectional view taken at line 8–8 of FIGURE 6;

FIGURE 9 is a perspective view of a part of a member capable of being employed in a joint construction of this invention; and FIGURE 10 is a cross-sectional view corresponding to FIGURES 3 and 5 showing joint constructions of the present invention.

The accompanying drawings are primarily intended so as to clearly illustrate or describe several presently preferred embodiments or forms of this invention. From a detailed consideration of these drawings and of the specification those skilled in the building art will realize that various minor modifications or changes may be made in the precise structures shown without departing from the features or principles of this invention which are summarized and defined in the appended claim.

As an aid to understanding this invention, it can be stated in essentially summary form that it concerns joints used to hold together various walls within a building, each of these joints having clip means serving to connect first and second panels located within the same plane, and holding means engaging these clip means and a third panel within a joint as herein described which is located transverse to the the first two panels. These holding means engage the clip means so as to firmly and rigidly position the panels mentioned with respect to one another.

The invention is best more fully explained by referring directly to the accompanying drawings. In FIGURE 1 there is shown a building 10 built so as to utilize roof and floor joints 12 and 14 used to secure together various identically formed horizontal and vertical panels 16 serving as walls, ceilings and floors within the building 10. All of the panels 16 are of a load-bearing category.

Each of the panels 16 used within the building 10 includes a center core 18 which is laminated between rigid sides 20. Preferably these panels 16 include a protective outer covering 22 on each of the sides 20. These coverings 22 may consist of any type of a protective film or the like. Thus, for example, the coating may consist of weather resistant polyvinyl chloride, urea-formaldehyde or similar films bonded to the sides 20 or they may consist of conventional paint applied to the sides 20. Preferably, the sides 20 are formed of a material such as plywood which is sufficiently strong from a physical point of view to adequately protect the panels 16 against damage; these sides 20 also serve to protect the core 18. In a panel 16 the core 18 is normally formed out of a relatively "soft" material having physical properties desired for insulation and other reasons such as polystyrene foam, a rigid polyurethane cellular composition or the like.

With the present invention the panels 16 utilized are preferably formed so that the sides 20 have ends 24 which are located parallel to one another beyond ends 26 of the cores 18 within these panels. Further, preferably small U-shaped brackets 28 are located between the sides 20 so that the ends 30 of these brackets 28 are bonded to and extend along the interiors of these sides, and so that the center portions 32 of the brackets 28 lie approximately against the ends 26 of the cores 18. Further, preferably these brackets 28 are provided with small slots 34 located in their center portions 32 adjacent to, but spaced from their ends 30. The purpose of this type of construction utilizing the brackets 28 in conjunction with the panels 16 will be apparent from a careful consideration of FIGURES 2–5 of the drawings.

In FIGURES 2 and 3 of the drawings there is shown a roof joint 12 of the present invention. In this joint two of the panels 16 are located in the same horizontal plane so that the ends 24 of the sides 20 of these panels are located parallel to and spaced from one another. In this joint 12 the two horizontal panels 16 are joined by a plurality of spaced, elongated, spring-like clips 36, each of which has an elongated, normally flat center portion 38 terminating in two end flanges 40. In the roof joint 12 these clips 36 span the distance between the two horizontal panels 16 with the end flanges 40 fitting within slots 34 so as to prevent movement of the two horizontal panels 16 apart from one another.

In each of the clips 36, a centrally located hole 42 serves to position a small screw 44 or similar fastener in such a manner that this screw 44 can be screwed into a holding device 46 used to secure the two horizontal panels 16 in the joint 12 to a vertically extending panel 16. Each holding device 46 consists of an internally threaded cylinder 48 having an enlarged base 50 which is secured in place so that the cylinder 46 projects through a centrally located opening 52 in another U-shaped bracket 54 corresponding to the bracket 28 previously described. Each bracket 54 has ends 56 attached to the center portion 53, and these ends 56 extend along and are secured as by an adhesive to the interiors of the sides 20 of the vertically extending panel so that the center portion 53 of the bracket 54 extends across the end 24 of the core 18 of this panel.

In the roof joint 12, the relative positions of the panels 16 connected by this joint are maintained through the use of a positioning channel 58. This positioning channel 58 includes a centrally located wall 60 having an opening 62 formed therein through which the cylinder 48 projects. It also includes side walls 64 extending parallel to each other at each of the ends of the walls 60 and side flanges 66 extending parallel to the wall 60 on the exteriors of the side walls 64 between the wall 60 and extremity of the side walls 64. In effect, this positioning channel 58 provides what may be termed a downwardly extending U-shaped channel between the side walls 64 and the wall 60 which fits around the ends 24 of the sides 20 of the vertical panel 16 in the joint 12 and generally L-shaped channels defined by the flanges 66 and the side walls 64 which engage the ends 24 of the sides 20 of the horizontally extending panels 16.

With this construction of the roof joint 12 when the screws 44 are tightened down within the cylinders 48, this causes the holding devices 46 to apply forces causing the various panels 16 of this joint to fit tightly within the positioning channel 58 as shown. By virtue of the fact that the clips 36 used in this joint 12 are of a resilient character, during such tightening of the screws 44, these clips 36 deform to a position as indicated in FIGURES 2 and 3 so as to provide a non-horizontal force component tending to pull the horizontal panels 16 up against the side walls 64 and the flanges 66 of the positioning channel 58. As a consequence of the forces applied in this manner the panels in the roof joint 12 are effectively locked or held together so that a joint is achieved which is sufficiently strong for all practical building purposes.

In order to prevent leakage in the space between the panels 16 in the roof joint 12, it is presently preferred to install a U-shaped drain gutter 68 in this space so that the ends 24 of the sides 20 of the two horizontal panels 16 in this joint fit against flanges 70 formed in the gutter 68 adjacent to its ends 72. It will be noted that the flanges 70 of the ends 72 do not project beyond the sides 20 of the horizontal extending panel 16. This gutter 68 may be conveniently secured in place through the use of an adhesive or the like; at the present time, however, it is preferred to attach it in place through the use of bent over strips 74 of water-resistant tape of a pressure-sensitive adhesive variety, such as Mylar for example, which extend along the sides 20 and along the interior of the channel 70.

The floor joint 14 employed in the building 10 is very similar to the roof joint 12 used in this building. In it are employed horizontal and vertical panels 16 and a holding device 46, all as previously described. Each holding device 46 is attached by means of a screw 44 forming a part of this device to a clip 36 which extends between the two horizontally-extending panels 16 in engagement with the brackets 28 in these panels as previously described. In addition, however, the floor joint 16 includes a support panel 76 of a U-shaped configuration, the ends of which are formed so as to include internal grooves 78 which are located so as to face one another. This support channel 76 contains openings 80 which are designed so as to permit the utilization of the holding device 46 and the clips 36 as previously described.

In the floor joint 14 the ends 24 of the sides 20 of the vertically extending panel 16 rest directly against the bottom 82 of the support channel 76 so as to eliminate the necessity for utilizing a separate positioning channel 58 for maintaining the various panels 16 carried by this floor joint in appropriate alignment with one another. The dimensions of this support channel 76 are preferably such that these ends 24 of the sides 20 of the vertically extending panel 16 are located generally between the ends 24 of the horizontally extending panels 16 as shown in FIGURES 4 and 5 when these horizontally extending panels 16 are supported upon the exteriors of the grooves 78 as shown.

One advantage of the particular shape of the support channel 78 utilized is the fact that a disc-shaped head 84 attached to an enlarged threaded shaft 86 may be inserted in the channel 76 so as to project into the grooves 78. With this type of construction the shaft 86 is preferably threaded into an opening 88 in a base 90 serving as a foundation. This permits the weight of the building 10 to be transmitted to the base 90 utilized by means of the support channel 76 resting against the head 84 employed.

In FIGURE 10 of the drawings there are shown vertical floors, ceilings and walls of a building 10 formed utilizing various parts such as have previously been described and formed utilizing various other parts as are indicated in FIGURES 6, 7, 8 and 9 of the drawings. For convenience of designation, as well as for brevity of description, the various parts illustrated in FIGURE 10 which are the same as, or substantially the same as, various parts previously described are not separately designated herein, and are designated both in the remainder of this specification and in the accompanying drawings by the primes of the numerals previously utilized to designate such parts.

From an examination of FIGURE 10 it will be seen that it utilizes panels 16' which are joined together through the utilization of a plurality of positioning channels 58'. At the lowermost portion of FIGURE 10 a joint 93 is shown in which the two panels 16' used are supported by one of these positioning channels 58' which in turn is supported upon an internally threaded disc 92 which fits between the side walls 64' of this channel 58' against the wall 60' of it. Preferably the exterior of the disc 92 is knurled so as to facilitate its being turned as may be required during the installation of the structure shown in FIGURE 10. This disc 92 carries an externally-threaded shaft 94 which is supported within a threaded opening 88' in a base 90' substantially as previously described. It will be noted that the shaft 94 extends through an opening 62' in the channel 58'.

The flanges 66' on the lowermost positioning channel 58' shown in FIGURE 10 carry the two horizontally extending panels 16′, and these panels 16′ are joined together through the use of clips 36′, the end flanges 40′ on which fit within slots 96 in elongated, generally U-shaped channels 98. The lowermost clip 36′ shown in FIGURE 10 is attached to the shaft 94 through the use of another screw 44′ which extends through a hole 42′ in the center portion 38′ of it.

From an examination of FIGURES 6 and 10 of the drawings it will be noted that the panels 16′ shown in these figures differ slightly from the panel 16 in that the brackets 28 previously described are not used and are replaced by the channels 98. The ends 100 of these channels 98 are fitted against the interiors of the sides 20′ of the panels 16′ and are secured in place as through the use of conventional appropriate adhesive. The center portions or bases 102 of the channels 98 employed contain rows of "scored openings" 104 which are designed to be "opened" as through the use of conventional screwdriver or similar tool. When the openings within these rows 104 are "opened" in this manner they provide the slots 96 through which the clips 36′ are attached and they also provide non-round, centrally disposed rectangular openings 106 which are designed so as to be used with holding device 46′ of the type shown in FIGURES 6, 7 and 8.

These modified holding devices 46′ include internally threaded cylinders 48′ and bases 50′ which are of the configuraton corresponding to the openings 106. They also include corner slots 108 having tapered sides. These devices 46′ are designed so that a particular holding device 46′ need not be assembled with respect to a panel 16′ in a factory, but so that on a job site appropriate openings 106 or slots 96 may be created in the channel 108 wherever desired with a minimum of difficulty and so that within any one of the openings 106 a holding device 46′ may be located by simply inserting it and twisting it so as to wedge appropriate portions of the base 102 into the slots 108.

In the construction shown in FIGURE 10 the joint 93 between the vertical panel 16′ shown at the center of this figure and the bottom two horizontal panels 16′ indicated in this figure is essentially the same as the joint 12 previously described. However, there is one difference in this construction. Because of problems pertaining to the accessibility of the screw 44′ used at the bottom of this vertically extending panel 16′ it is normally preferred to form the hole 42′ in the clip 36′ used in conjunction with it sufficiently large so as to pass the head of the screw 44′ and to utilize a rightening bar 110 as indicated in FIGURE 9 of the drawings so as to clamp the clip 36′ instead of tightening this clip in place through the use of the screw 44′ alone.

This bar 110 is of an elongated construction, and preferably includes a plurality of generally L-shaped slots 112 extending along its length and sloping surfaces 114 extending along its length generally parallel and opposite each of the slots 112. Further, sufficient of these slots 112 and surfaces 114 are provided on the bar so as to correspond to the number of different holding devices 46′ which are utilized in conjunction with a single panel 16′. With this construction the screws 44′ may be loosely inserted within the cylinders 48′ and the bar 110 may be positioned within the space at an intersection of panels 16′ and moved slightly so that the screws 44′ project through the slots 112 and so that this bar 110 is supported by the heads of these screws 44′. When so positioned the bar 110 may be moved by a hammer or the like so as to cause the center portions 38′ of the clips 36′ to ride up on the surfaces 114. This has the effect of deforming and tightening the clips 36′ so as to securely hold panels such as the three lowermost panels 16′ shown in FIGURE 10 of the drawings together, creating a tight joint 109.

Another joint 115 of a similar category is shown at the top of FIGURE 10 between the three uppermost panels 16′. Inasmuch as this joint 115 is virtually identical to the joint 12 previously described, it is not separately described.

With the modified construction indicated in FIGURE 10 a different type of gutter 116 than the gutter 68 previously described is utilized so as to form a moisture-seal between the exposed ends 24′ of the sides 20′ of the two uppermost horizontally extending panels 16′. This gutter 116 is of a generally U-shape and is provided with a horizontally extending base 118 and vertical sides 120 which carry outwardly extending flanges 122. These flanges 122 are utilized in pairs and are designed so as to fit snugly over, against and around ends 24′ of sides 20′ of the panels 16′. Preferably the gutter 116 is formed out of an extruded, resilient material such as light stabilized polypropylene, polystyrene or the like capable of being temporarily deformed so as to be snapped into place with the ends 24′ fitting between flanges 122. If desired, an adhesive (not shown) may be located on the surfaces of these flanges 122 so as to bond the gutter 116 in place, or if desired, strips 74′ of an adhesive-coated tape may be used so as to form a watertight connection between the panels 16′ shown and the gutter 116.

From an examination of FIGURE 10 of the drawings it will be realized that the joints employed in it are very closely related to the joints 12 and 14 previously described and that the entire structure shown in FIGURE 10 differs in that all the joints in it are created utilizing positioning channels 58′ of identical configuration. The purpose of this, of course, is to reduce the number of parts which have to be transported to a job site.

From a careful consideration of this entire specification and the accompanying drawings those skilled in the art to which this invention pertains will realize that joint constructions as herein described may be very easily created with comparatively unskilled labor using a minimum of tools. They will also realize that these joint constructions are sufficiently satisfactory for virtually all building purposes, and that if desired they may be utilized in creating multi-storied buildings or structures as well as single-storied buildings.

Because of the nature of this invention it is to be considered as being limited solely by the appended claim forming a part of this disclosure.

I claim:

A joint construction comprising:
  a plurality of panels being arranged with a first and second panel in the same plane and being spaced apart from each other to form a gap with a third panel being disposed at right angles to the other two panels and aligned with the gap between the first and second panels,
    the panels including ends that have a bracket secured thereto and the brackets having openings therethrough,
  a channel fitting between the first and second panels and having a pair of spaced apart L-shaped flanges individually abutting and engaging the ends of the first and second panels and a U-shaped side wall extending over the third panel and engaging the same,
  a resilient clip having a pair of flanges individually extending through respective bracket openings and engaging the first and second panels, and
  a fastener extending through an opening in the U-shaped side wall of the channel and through the bracket of the third panel with the fastener being secured in the third panel,
    the fastener including a portion engaging the clip whereby in the assembled state the fastener causes the first and second panels to be forced against the L-shaped flanges and urges the third panel into the U-shaped side wall of the channel thereby preventing relative movement between the panels.

(References on following page)

References Cited by the Examiner

UNITED STATES PATENTS

| | | | |
|---|---|---|---|
| 1,419,126 | 6/1922 | Besnard | 52—13 |
| 2,007,618 | 7/1935 | Snead | 52—479 |
| 2,047,572 | 7/1936 | Balch et al. | 52—272 |
| 2,384,719 | 9/1945 | Anderson | 52—13 |
| 2,648,248 | 8/1953 | Cederquist | 85—32 |
| 2,723,584 | 11/1955 | Parker | 85—32 |
| 2,732,044 | 1/1956 | McClune | 189—36 |
| 2,834,064 | 5/1958 | Clements | 52—578 |
| 2,858,582 | 11/1958 | Toulmin | 52—578 |
| 2,986,245 | 5/1961 | Tuttle | 52—282 |
| 2,997,141 | 8/1961 | Wetzler | 52—730 |
| 3,000,144 | 9/1961 | Kitson | 52—309 |
| 3,009,549 | 11/1961 | Miller | 52—738 |

FOREIGN PATENTS

| | | |
|---|---|---|
| 71,701 | 11/1950 | Denmark. |
| 281,053 | 6/1952 | Switzerland. |

RICHARD W. COOKE, Jr., *Primary Examiner.*

JACOB SHAPIRO, FRANK L. ABBOTT, *Examiners.*

J. D. LISTER, M. O. WARNECKE, *Assistant Examiners.*